United States Patent [19]
Hida et al.

[11] 3,794,971
[45] Feb. 26, 1974

[54] VEHICLE SPEED SENSING DEVICE

[75] Inventors: Takashi Hida, Toyota; Naoji Sakakibara, Chiryu; Nobuyuki Hashimoto, Nagoya, all of Japan

[73] Assignee: Aisin Seiki Kabushiki Kaisha, Kariya City, Japan

[22] Filed: Aug. 25, 1972

[21] Appl. No.: 283,760

[30] Foreign Application Priority Data
Sept. 10, 1971 Japan............................. 46-070571

[52] U.S. Cl. .................. 340/53, 340/62, 340/263, 180/105 E
[51] Int. Cl. .................................................. B60q 1/54
[58] Field of Search...... 340/52 R, 52 F, 53, 62, 66, 340/71, 263; 180/105 R, 105 E, 106, 110

[56] References Cited
UNITED STATES PATENTS

| | | | |
|---|---|---|---|
| 3,504,754 | 4/1970 | Marie | 180/106 X |
| 3,249,175 | 5/1966 | Baxter | 180/105 E |
| 3,203,501 | 8/1965 | Carter et al. | 340/53 X |
| 2,273,365 | 2/1942 | McCullough | 340/53 |

Primary Examiner—Alvin H. Waring
Attorney, Agent, or Firm—Pierce, Scheffler & Parker

[57] ABSTRACT

A speed sensing device for a vehicle comprising a governor means movable proportional to vehicle speed, a lever pivotally mounted on a housing of the device at one end thereof so as to oscillate in response to movement of the governor means, permanent magnet means secured to the other end of the lever and reed switching means secured to the housing and adapted for cooperating with the magnet means being displaced with the lever to thereby sense the vehicle speed.

10 Claims, 3 Drawing Figures

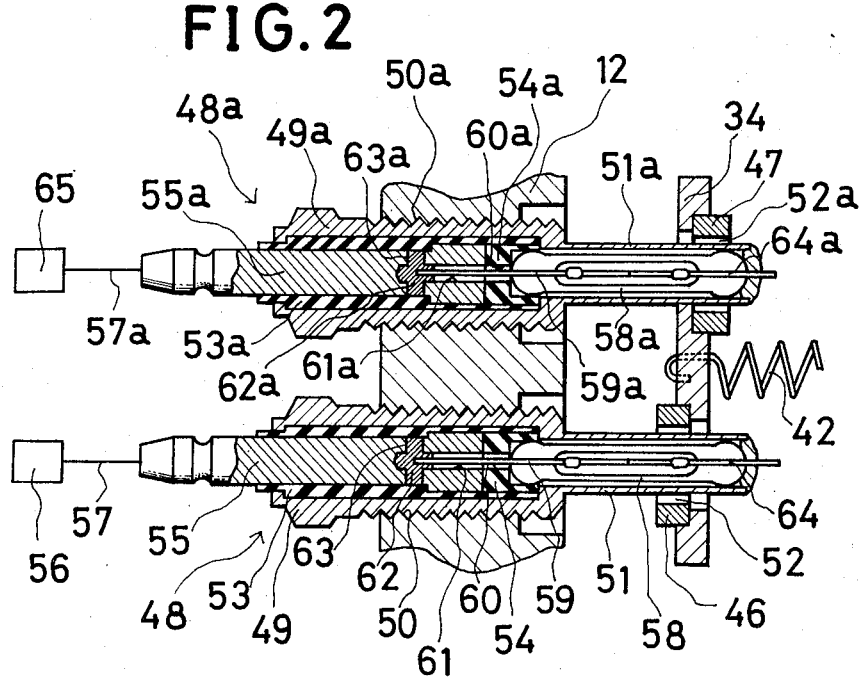

VEHICLE SPEED SENSING DEVICE

BACKGROUND OF THE INVENTION

The present invention relates to a speed sensing device, and more particularly to an improved vehicle speed sensing device for a vehicle.

Conventionally, vehicle speed sensing devices have been designed which utilized speed sensing means such as engine governor means. However, such governor means are adapted to connect directly mechanically to switching means such as microswitches, switches having ordinary contacting terminals and the like to deliver an instructive signal when the vehicle speed exceeds a predetermined value. Therefore, in mechanically contacting between the governor means and the switching means the sparks are emitted therefrom, and thus the machanically contacting portions of the switching means will be apt to wear. In addition, the switching means will not be switched on and off surely at the appointed position because the switching means will be actuated mechanically by the governor means. In order to obviate the above-mentioned drawbacks prior speed sensing devices providing for snap action spring means have been proposed wherein the switching means are snapped on and off under the influence of the snap action spring means turned over by the biasing force thereof at the predetermined position. In such speed sensing devices, however, the governor means will have to move against the biasing force of the spring, and a large difference between the actuating speed of the switching means urged and actuated to "on" position thereof and the actuating speed of the switching means urged and actuated to "off" position thereof is recognized. Accordingly, such switching means will not be switched on and off surely in response to the vehicle speed.

SUMMARY OF THE INVENTION

It is, therefore, an object of the present invention to provide an improved speed sensing device obviating the above-mentioned drawbacks.

It is another object of the present invention to provide an improved speed sensing device wherein switching means for sensing the vehicle speed are actuated by the magnetic field of permanent magnet means operatively connected to a governor means movable proportional to the vehicle speed.

It is another object of the present invention to provide an improved speed sensing device wherein a lever has an intermediate portion operatively engaged with the governor means and an end portion on which the permenent magnet means is mounted whereby slight movement of the governor means causes the magnet means to move after magnification so that the switching means cooperating with the magnet means will be actuated with a high accuracy relative to the set vehicle speed.

It is a further object of the present invention to provide an improved speed sensing device wherein sensing levels of the vehicle speed will be easily varied.

It is a still further object of the present invention to provide an improved speed sensing device which is simple in construction and low in cost.

BRIEF DESCRIPTION OF THE DRAWINGS

These and further objects and advantages of the present invention will appear and become obvious upon a reading of the detailed description of the invention and a review of the appendant drawings in which:

FIG. 2 is an enlarged sectional view taken along the line 2—2 of FIG. 1; and

DETAILED DESCRIPTION OF THE INVENTION

Figure 1:
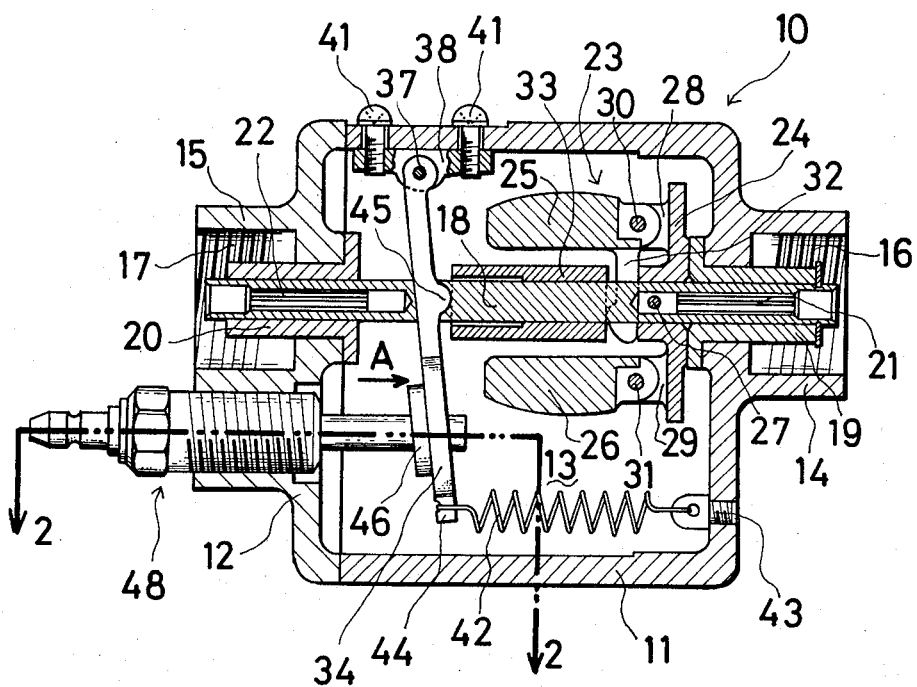
FIG. 1 is a cross-sectional view, with parts in elevation, showing one embodiment of the present invention.
Figure 3:
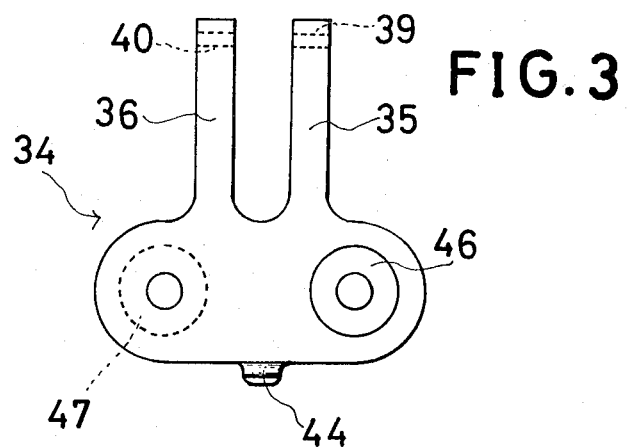
FIG. 3 is a view showing a fork shaped lever used in the present invention and seen from arrow A of FIG. 1.

Referring now to the drawings, a speed sensing device is shown generally at 10 and includes a housing 11 to one end of which a case cover 12 is attached to thereby define a space 13 therein. The housing 11 and the case cover 12 have respectively annular axially outwardly extending portions 14 and 15 providing screw threads 16 and 17 at the respective inner peripheries. A shaft 18, at both ends, is rotatably supported by bearings 19 and 20 and extend through the housing 11 and the case cover 12 inwardly of the extending portions 14 and 15. At its rightward end the shaft 18 may be attached to a speedometer cable, not shown, through a plurality of splines 21 formed in the shaft 18 so as to rotate at a speed dictated by the speed of the vehicle wherein the speedometer cable extends to a conventional transmission, not shown. The speedometer cable is supported by a fitting, not shown, screw threaded with the extending portion 14 of the housing 11 through the screw threads 16. In the same manner, the leftward end of the shaft 18 is connected through a plurality of splines 22 formed in the shaft 18 to a speedometer cable, not shown, and is supported by a fitting, not shown, and screw threaded with the extending portion 15 of the case cover 12 through screw threads 17. The last mentioned speedometer cable will extend to a speedometer, not shown. A centrifugal governor means 23 comprises an input carrier 24 and a pair of weights 25 and 26. The carrier 24 is mounted on the shaft 18 by a pin 27 so as to rotate therewith at the speed dictated by the shaft 18. The weights 25 and 26 are pivotally mounted on outer ends 28 and 29 of the carrier 24 through pivot pins 30 and 31 whereby each of the weights 25 and 26 pivots outwardly due to centrifugal force upon rotation of the shaft 18 and the carrier 24. The weights 25 and 26 include radially inwardly extending arms 32 only one of which is shown in FIG. 1. These arms 32 engage a sleeve member 33 mounted loosely on the shaft 18. Thus the sleeve member 33 is capable of axially sliding movement over the shaft 18 corresponding to the outward pivoting of the weights 25 and 26. A fork shaped lever 34 made of nonmagnetic material is forked off into two branches 35 and 36, as viewed in FIG. 3, between which the shaft 18 extends. At their outer ends the branches 35 and 36 of the lever 34 have a pivot pin 37 which extends through a mounting block 38 into openings 39 and 40 formed in the branches 35 and 36, as viewed in FIG. 3, so that the lever 34 is pivotally mounted on the block 38 attached to the housing 11 by screw means 41, 41. A spring 42 attached by screw means 43 to the housing 11 engages an outer end 44 of the lever 34 and acts so as to urge the lever 34 in a direction opposite to the force applied thereto by the pivoted weights 25 and 26 through the sleeve member 33 wherein convex portions 45 formed respectively in the branches 35 and 36 of the lever 34 will engage the sleeve member 33. A pair of annular permanent magnets 46 and 47 are secured to the both sides of the lever 34 as shown in FIG. 2. Numerals 48 and 48a represent, respectively, switching means. The switching means 48 includes a housing 49 having threads 50 thereon which are screw threaded through the case cover 12. This housing 49 is made of a good conductor and a non-magnetic material. The housing 49 is provided with an axial extension 51 extending inwardly of the space 13 through the lever 34 and the magnet 46. There is a gap 52 between the extension 51 of the housing 49 and the magnet 46, and thus the magnet 46 will not be contacted with the extension 51 even when the magnet 46 is displaced, as will be clear hereinafter. An insulator 53 is disposed within and secured to the housing 49. Disposed within the insulator 53 are a further insulator 54 and a good conductive terminal 55. At its leftward end the terminal 55 extends outwardly of the housing 49 and connects electrically to an alarm device 56 through a conductive wire 57 as viewed in FIG. 2. The alarm device 56 is arranged so as to deliver an alarm signal when the vehicle speed exceeds a first predetermined value, as will be clear hereinafter. A reed switch 58 of a conventional magnetic type is placed within the extension 51 of the housing 49, the reed switch 58 being actuated by the magnetic field of the magnet 46 so as to open and close the contacts thereof. A conductive wire 59 extends leftwardly from the switch 58 through axial openings 60 and 61 formed respectively in the insulator 54 and the terminal 55. An end of the wire 59 is connected electrically to the terminal 55 through a good conductor 62 interposed within a radially extending opening 63 provided in the terminal 55. This conductor 62 may be made by pouring solder and the like into the opening 63. A further conductive wire 64 extends rightwardly from the switch 58 and connects electrically to the extension 51 of the housing 49. The construction of the switching means 48a will be shown by attaching the same reference with affix a to each of the constructive elements of the switching means 48a corresponding to that of the switching means 48 because the construction of the switching means 48a will be the same as that of the switching means 48. However, the reed switch 58a is actuated by the magnetic field of the magnet 47, and the terminal 55a is connected electrically to a vehicle speed-limiting mechanism 65, as shown in FIG. 2, which is disclosed in detail in our U.S. Patent Application Ser. No. 227,380 filed Feb. 18, 1972 wherein the throttle valve actuates to decrease the vehicle speed when the vehicle speed exceeds a second or upper limiting predetermined value.

The terminal 55a may be connected electrically to a conventional constant speed travelling mechanism wherein a lower speed limiting switch is connected electrically to the terminal 55a for allowing the mechanism to move into its non-operative position as the vehicle speed decreases under a predetermined value. Otherwise, the terminal 55a may be connected to an upper speed limiting switch of a conventional constant speed travelling mechanism which allows the mechanism to move into its non-operative position as the vehicle speed exceeds a predetermined value.

In addition, by turning of the screw threads 50 and 50a of the housings 49 and 49a the reed switches 58 and 58a will be displaced axially relative to the magnets 46 and 47, so that sensing levels of the vehicle speed for actuating the switches 58 and 58a will be varied.

In operation, the shaft 18 rotatable proportional to the vehicle speed causes the weights 25 and 26 to move outwardly so that the sleeve member 33 engaged with the arms 32 of the weights 25 and 26 is urged so as to move axially leftwardly on the shaft 18 in opposition to the spring 42. Therefore, the lever 34 which has the convex portions 45 engaged with the sleeve member 33 is pivoted in a clockwise direction around the pin 37 in response to movement of the sleeve member 33 whereby the magnets 46 and 47 secured to the lever 34 are displaced.

Now, assuming that the vehicle speed reaches the first predetermined value, the lever 34 with the magnets 46 and 47 is pivotally displaced in a first position in which the reed switch 58 is actuated by the magnetic field of the magnet 48. By this actuating of the reed switch 58 the alarm device 56 is operated through the terminal 55 and the wire 57 to thereby deliver the alarm signal. Thus the driver can know that the vehicle speed is going to approach the upper speed limiting value.

Assume that the vehicle speed increases and reaches the upper speed limiting value, the lever 34 is displaced in a second position wherein the reed switch 58a is actuated by the magnetic field of the magnet 47. Accordingly, the vehicle speed limiting mechanism 65 is operated by the switch 58a through the terminal 55a and the wire 57a so as to decrease the vehicle speed.

As will be clear hereinbefore, the lever 34 is adapted for engaging the sleeve member 33 at the substantial center of the lever 34 and the magnets 46 and 47 are adapted for attaching to the outer end of the lever 34. Therefore, slight movements of the sleeve member 33 allows the magnets 46 and 47 to move after magnification, and thus the switches 58 and 58a which cooperate with the magnets 46 and 47 will be actuated with high accuracy.

Various other modifications and variations of the present invention are obviously possible in light of the above teachings. It is to be understood, therefore, that within the scope of the appended claims, the invention may be practiced otherwise than as specifically described herein.

What is claimed is:

1. A vehicle speed sensing device for a vehicle comprising a housing, a governor means movable proportional to vehicle speed, a lever connected operatively to said governor means and movable thereby in one direction, spring means disposed so as to bias said lever against movement of said governor means, magnet means attached to said lever so as to be displaced therewith, and switching means secured to said housing and being actuated by said magnet means to thereby sense the vehicle speed.

2. A vehicle speed sensing device as set forth in claim 1 wherein a shaft is rotatable in response to the vehicle speed and allows said governor means to rotate therewith, and an axially slidable sleeve member is supported on said shaft and is disposed between said governor means and said lever whereby said lever is arranged so as to engage said sleeve member displaced by said governor means.

3. A vehicle speed sensing device as set forth in claim 2 wherein said lever is of a fork shaped configuration.

4. A vehicle speed sensing device as set forth in claim 2 wherein said lever comprises one end portion pivotally mounted on said housing, an intermediate portion engaged said sleeve member and the other end portion to which said magnet means is secured.

5. A vehicle speed sensing device as set forth in claim 2 wherein said governor means comprises a pair of weights pivoted outwardly in proportion to the vehicle speed, said weights comprising radially inwardly extending arms engageable with said sleeve member.

6. A vehicle speed sensing device as set forth in claim 1 wherein said switching means comprises a housing and reed switching means accomodated within said housing of said switching means and actuated by said magnet means.

7. A vehicle speed sensing device as set forth in claim 6 wherein said housing of said switching means includes screw threads thereon which are threaded through said housing of said device whereby the position of said reed switching means relative to said magnet means will be varied by turning of said screw threads.

8. A vehicle speed sensing device as set forth in claim 1 wherein said magnet means includes a pair of permanent magnets and said switching means includes first and second reed switches actuated, respectively, by the corresponding one of said magnets, said first reed switch being actuated as the vehicle speed exceeds a first predetermined value and said second reed switch being actuated as the vehicle speed exceeds a second predetermined value which is larger than said first predetermined value.

9. A vehicle speed sensing device as set forth in claim 8 wherein said first reed switch is connected electrically to an alarm device and said second reed switch is connected electrically to a vehicle speed limiting mechanism.

10. A vehicle speed sensing device as set forth in claim 8 wherein one of said magnets is secured to one side of said lever and the other of said magnets is secured to the other side of said lever.

* * * * *